United States Patent [19]

Verhoeven et al.

[11] Patent Number: 5,062,025

[45] Date of Patent: Oct. 29, 1991

[54] ELECTROLYTIC CAPACITOR AND LARGE SURFACE AREA ELECTRODE ELEMENT THEREFOR

[75] Inventors: John D. Verhoeven; Edwin D. Gibson, both of Ames, Iowa

[73] Assignee: Iowa State University Research Foundation, Ames, Iowa

[21] Appl. No.: 529,148

[22] Filed: May 25, 1990

[51] Int. Cl.$^5$ .............................................. H01G 9/05
[52] U.S. Cl. .................................. 361/509; 29/25.03
[58] Field of Search ............... 361/508, 509, 528, 529; 29/25.03

[56] References Cited

U.S. PATENT DOCUMENTS

| | | | |
|---|---|---|---|
| 4,378,330 | 3/1983 | Verhoeven et al. | 420/432 |
| 4,770,718 | 9/1988 | Verhoeven et al. | 148/11.5 P |
| 4,805,074 | 2/1989 | Harakawa et al. | 29/25.03 X |
| 4,832,738 | 5/1989 | Schmidt et al. | 75/10.23 |

FOREIGN PATENT DOCUMENTS 0170867 2/1986 European Pat. Off. .

OTHER PUBLICATIONS

Developments in Electrolytic Capacitors, Journal of the Electrochemical Society, 12–77, Capacitors, Scientific American, Jul. 1988.
Anodic Oxidation of Porous Aluminum Pellets, Electrocomponent Science & Technology, 1974.
J. D. Verhoeven, "Copper–Refractory Metal Alloys", Journal of Metals, Sep. 1986.
John D. Verhoeven, "The Emissivity of Etched Cu–Nb in-situ Alloys", J. Appl. Phys., Apr. 1987.
John D. Verhoeven et al., "Characteristics of P/M Processed Cu–Nb Composites", The Metallurgical Society, 1988.
Bevk et al., "Anomalous Increase in Strength of in situ formed Cu–Nb Multifilamentary Composites", J. Appl. Phys., Dec. 1978.
Funkenbusch et al., "Fabricability of and Microstructural Development in Cold Worked Metal Matrix Composite, Scripta Metallurgica", vol. 18, pp. 1099–1104, 1984.
Bevk et al., "Mechanical Properties of Cu-Based Composites with In–Situ Formed Ultrafine Filaments", In–Situ Composites IV, 1982.
Driver, "The Development of the Capacitor Industry and its Position in World Markets", Electrocomponent Science & Technology, vol. 5, 1978.
Foner, "Development of High Performance Superconductors", by Powder Metallurgy.
Taylor, "A Metal-Semiconductor Compacitor", Journal of the Electrochemical Society, Nov. 1956.
Spitzig et al., "A Comparison of the Strength and Microstructure of Heavily Cold Worked Cu-20% Nb Composition Formed by Different Melting Procedures", Scripta Met. 21.
Verhoeven et al., "Deformation Processed Cu–Refractory Metal Composites", Mat. & Mft. Proc. 4.

Primary Examiner—Brian W. Brown
Assistant Examiner—Khanh Dang
Attorney, Agent, or Firm—Tilton, Fallon, Lungmus & Chestnut

[57] ABSTRACT

An electrode element for an electrolytic capacitor comprises an electrode body having a plurality of ultra-fine, ribbon-shaped filaments of Al and X (where X is selected from Nb and Ta) interspersed and aligned along an axis of the body. The Al filaments are preferentially removed from a portion of the electrode body to provide a large surface area electrode surface comprising exposed end surfaces of the Al filaments and exposed lengths of the X filaments protruding beyond the exposed end surfaces of the Al filaments. Dielectric oxide films are formed on the exposed surfaces of the Al filaments and on the exposed lengths of the X filaments by an anodizing operation. A solid or liquid electrolyte is infiltrated into interfilament interstices between the exposed lengths of the X filaments and a cathode electrode is placed in electrically conductive relation to the electrolyte to form an electrolytic capacitor.

39 Claims, 7 Drawing Sheets

ELECTROLYTIC CAPACITOR AND LARGE SURFACE AREA ELECTRODE ELEMENT THEREFOR

CONTRACTUAL ORIGIN OF THE INVENTION

This invention was made under a contract between the U.S. Department of Commerce and Iowa State University, Ames, Iowa.

FIELD OF THE INVENTION

This invention relates to electrolytic capacitors and to large surface area electrode elements therefor as well as to methods for their manufacture.

BACKGROUND OF THE INVENTION

Electrolytic capacitors of various types are in widespread use in the electronics industry as a result of their desirable electrical characteristics over a relatively wide temperature range, compact size, low cost and long life. Metal foil electrolytic capacitors and sintered, powder metal electrolytic capacitors using either a liquid or a solid electrolyte are described by Walter J. Bernard in an article entitled "Developments in Electrolytic Capacitors", *Journal Of The Electrochemical Society*, Vol. 124-No. 12, December 1977.

These electrolytic capacitors achieve high capacitance per unit volume or weight by virtue of an extremely thin dielectric oxide film formed on the anode electrode surface in conjunction with an extremely high anode electrode surface area. As is well known, the capacitance of the electrolytic capacitor varies inversely with the thickness of the dielectric oxide film and directly with the surface area of the anode electrode. The thin dielectric oxide film is typically formed on the anode electrode surface by an electrochemical anodizing treatment in a suitable acid or base solution as is well known; e.g., see the article by Donald M. Trohe entitled "Capacitors", *Scientific American*, July, 1988, pp. 86-90 and another article by W. J. Bernard et al entitled "Anodic Oxidation Of Porous Aluminum Pellets", *Electrocomponent Science and Technology*, Vol. 1, 1974, pp. 59-64 (Gordon and Breach Science Publishers Ltd).

Considerable effort has been expended to increase anode electrode surface as a way to increase the capacitance of electrolytic capacitors. In the metal foil type of electrolytic capacitor, high anode electrode surface areas have been achieved through chemical or electrochemical etching of the foil electrode surface. On the other hand, the sintered, metal powder electrolytic capacitor has relied on the porous nature of the sintered, powder metal anode electrode to provide a large electrode surface area. In particular, the anode electrode comprises a body made by compressing a metal powder/binder mixture to a desired electrode shape and then sintering the compressed body at elevated temperature to sinter the metal powder particles together and burn out the binders. Removal of the binder leaves a highly porous electrode body having a tremendous particulate surface area exposed within the body to act as an electrode surface.

Although the capacitor industry has been successful in increasing the capacitance of electrolytic capacitors with such developments as the aforementioned anodized, etched foil electrode element and anodized, sintered powder metal electrode element, there is a continuing desire in the industry for a capacitor electrode element that exhibits a large electrode surface area amenable to anodizing treatments to form a thin, dielectric oxide film thereon and that offers the possibility of achieving still further increases in the capacitance of an electrolytic capacitor without corresponding increases in capacitor size.

SUMMARY OF THE INVENTION

The present invention contemplates a new capacitor electrode element for improving the capacitance per unit volume or weight of an electrolytic capacitor. The capacitor electrode element in accordance with the invention comprises an electrode body having a plurality of elongated, preferably ribbon-shaped filaments of Al and X, where X is selected from the group consisting of Nb and Ta, interspersed and aligned along an axis of the body. The electrode body includes an electrode surface comprising exposed surfaces (e.g., exposed ends) of the Al filaments and exposed lengths of the X filaments protruding beyond the exposed surfaces of the Al filaments. The exposed surfaces of the Al filaments and the exposed lengths of the X filaments number in the millions on the electrode surface to provide an extremely large electrode surface area. Ribbon-shaped filaments of Al and X preferably exhibiting a thickness of about 0.01 micron to about 0.50 micron are preferred to this end.

The exposed surfaces of the Al filaments and the exposed lengths of the X filaments have thin dielectric oxides of Al and X, respectively, formed thereon so as to constitute the dielectric layer of the electrolytic capacitor.

Interfilament interstices disposed between the exposed lengths of the X filaments receive a solid electrolyte (e.g., manganese dioxide) or a liquid electrolyte (e.g., an appropriate ionic salt dissolved in a non-aqueous solvent such as dimethyl formamide) in contact with the dielectric oxides of Al and X. A cathode electrode is placed in electrically conductive relation to the dielectric oxides of Al and X via the electrolyte.

Electrolytic capacitors in accordance with the invention exhibit highly useful capacitance values (CV/g where C is capacitance in micro-farads, V is the formation voltage of the dielectric oxide films on the electrode surface and g is the mass in grams of the capacitor) at least equivalent to those obtainable from sintered, powder metal electrolytic capacitors heretofore used.

In accordance with a method of the invention, the capacitor electrode body is formed in a manner to provide a composite microstructure of elongated, ultra-fine filaments of Al and X interspersed and aligned along an axis of the electrode body. Preferably, the composite electrode body is formed by mechanical working of a mixture of powders of Al and X to form an elongated member (e.g., wire, rod, strip, etc.) with thin ribbon-shaped Al and X filaments aligned along the longitudinal axis thereof. Generally, the powder mixture, and thus the electrode body produced by mechanical working of the powder mixture, will comprise about 50 volume percent to about 95 volume percent, preferably about 80 volume percent to about 90 volume percent, of the filaments of X with the balance being the Al filaments.

The Al filaments are selectively removed from a portion of the electrode body to a selected depth to form the electrode surface described hereinabove having the extremely large electrode surface. Preferably, the Al filaments are preferentially dissolved from around the X filaments to a selected axial depth along the electrode body.

The dielectric oxides of Al and X are then formed in-situ (e.g., by anodization) on the respective exposed surfaces of the Al filaments and the exposed lengths of the X filaments. The interfilament interstices are infiltrated with a solid or liquid electrolyte and then a cathode electrode is disposed in contact with the electrolyte to complete the electrolytic capacitor.

The aforementioned objects and advantages of the invention will become more readily apparent from the following detailed description and drawings.

DETAILED DESCRIPTION OF THE INVENTION

Figure 1:
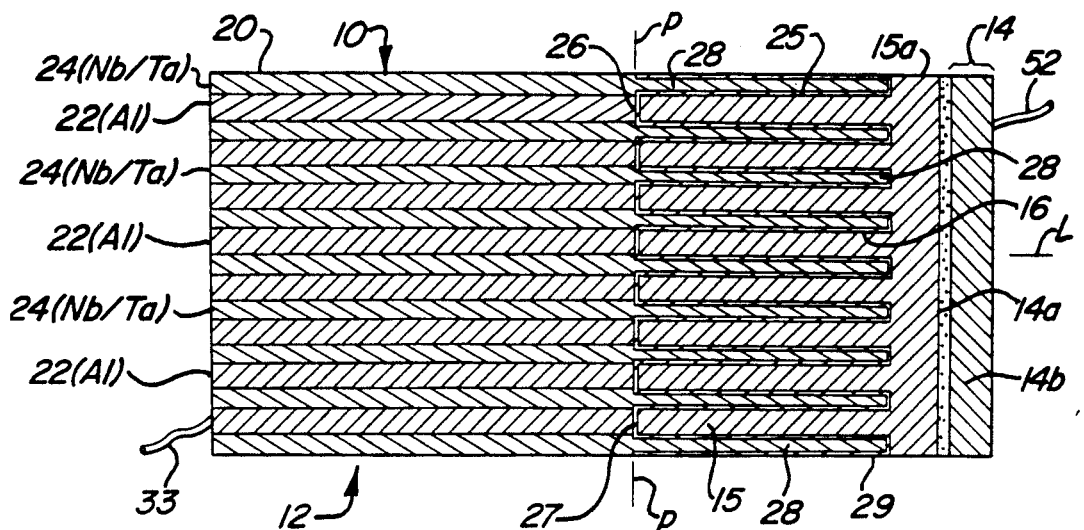
FIG. 1 is a highly schematic and enlarged illustration of an electrolytic capacitor in accordance with the invention.

Referring to FIG. 1, an electrolytic capacitor 10 constructed in accordance with one embodiment of the invention is illustrated in schematic fashion and considerably enlarged in scale for clarity. In particular, the electrolytic capacitor 10 is shown including an anode electrode element 12, a cathode electrode element 14 and an electrolyte 15 between the anode and cathode elements 12,14. A thin dielectric layer 16 is formed on the anode electrode element 12 in a manner to be described. The electrolytic capacitor 10 is useful, although not limited, to operation at a working voltage between about 5V(DC) and about 110V(DC).

In accordance with the present invention, the anode electrode element 12 includes a composite electrode body 20 having a plurality of elongated, ultra-fine filaments of Al and X, where X is selected from the group consisting of niobium (Nb) and tantalum (Ta), dispersed and aligned along the longitudinal axis of the electrode body 20. The filaments of Al are designated by reference numeral 22 whereas the filaments of X (Nb/Ta) are designated by the reference numeral 24. As will become apparent from the description set forth hereinbelow, the filaments of Al and X (Nb/Ta) preferably have a thin, ribbon shape.

The anode electrode body 20 includes an electrode surface 25 comprised of exposed surfaces 26 (e.g., exposed ends) of the Al filaments 22 and exposed lengths 28 of the X filaments 24 protruding beyond the exposed surfaces 26 of the Al filaments. As is apparent, the exposed Al surfaces 26 are oriented in a plane P that is transverse, preferably perpendicular, to the longitudinal axis L of the electrode body 20. The exposed lengths 28 of the X filaments 24 extend generally parallel with the longitudinal axis L beyond the plane P (defined by exposed Al filament ends 26) to provide elongated interfilament interstices 30 therebetween (see FIG. 4). As will become apparent hereinbelow, the electrode surface 25 is formed by selectively removing the Al filaments 22 to a selected axial depth D (FIG. 4) along the longitudinal axis L of the electrode body 20.

Figure 2:
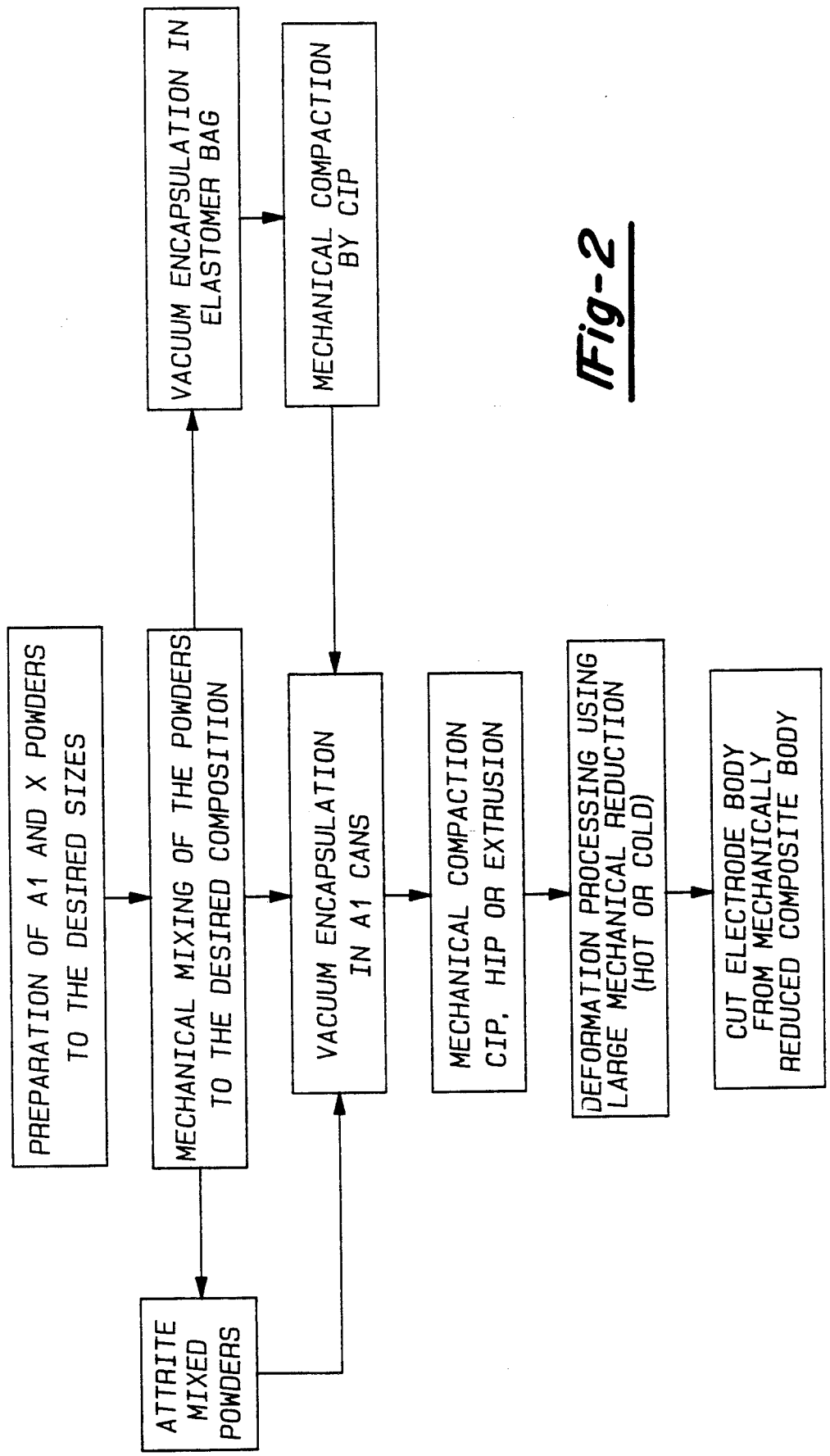
FIG. 2 is a block flow sheet illustrating method steps for forming the composite electrode body of the invention.

Referring to FIG. 2, the anode electrode body 20 is fabricated from a starting mixture of Al and X (Nb/Ta) powders of selected particle sizes (e.g., Al powder of −325 mesh size and X powder of 200 mesh size although other particle sizes may be used in practicing the invention). The Al powder is available commercially from Alcoa Aluminum Co. of America, P.O. Box 472, Rockdale, Tex. 76567. The Ta powder is available commercially from Fansteel Corp., No. 1 Tantalum Place, North Chicago, Ill. 60064, and Cabot Corp., 300-T Holly Road, Boyertown, Pa. 19512. The Nb powder is commercially available from Teledyne Wah Chang Albany, P.O. Box 460, Albany, Oreg. 97321.

The starting powder mixture generally comprises about 50 volume percent to about 95 volume percent (v/o) of X (Nb/Ta) powder with the balance being Al powder. Preferably, about 80 to about 90 volume percent of the starting powder mixture comprises the X (Nb/Ta) powder, the balance being the Al powder.

As shown in FIG. 2, the selected proportions of the Al powder and X (Nb/Ta) powder are initially mechanically mixed to provide a uniform distribution of each powder in the starting powder mixture. The as-mixed starting powder mixture may optionally be passed through a conventional mechanical attriter to reduce the powder size and produce generally flattened, elongated powder particles.

Referring again to FIG. 2, the Al/X starting powder mixture can be directly vacuum encapsulated in an Al container and thereafter subjected to a mechanical powder compaction operation, such as, for example, cold isostatic pressing (CIP), hot isostatic pressing (HIP), extrusion, tapping and the like, to densify the Al/X powder mixture to an appropriate billet shape that exhibits, for example, a density of from about 80% to about 98% of theoretical, depending upon the powder compaction technique employed.

Alternately, as shown in FIG. 2, the Al/X starting powder mixture can e vacuum encapsulated in an elastomeric bag (e.g., a urethane bag) and subjected to a preliminary cold isostatic pressing operation to partially consolidate the Al/X powder mixture prior to vacuum encapsulation in the Al container.

Although the invention is not limited to any particular powder compaction process (or combinations of compaction processes) to form the consolidated powder billet, certain specific powder compaction processes are illustrated in more detail in the Examples 1–4 set forth hereinbelow.

Figure 3:
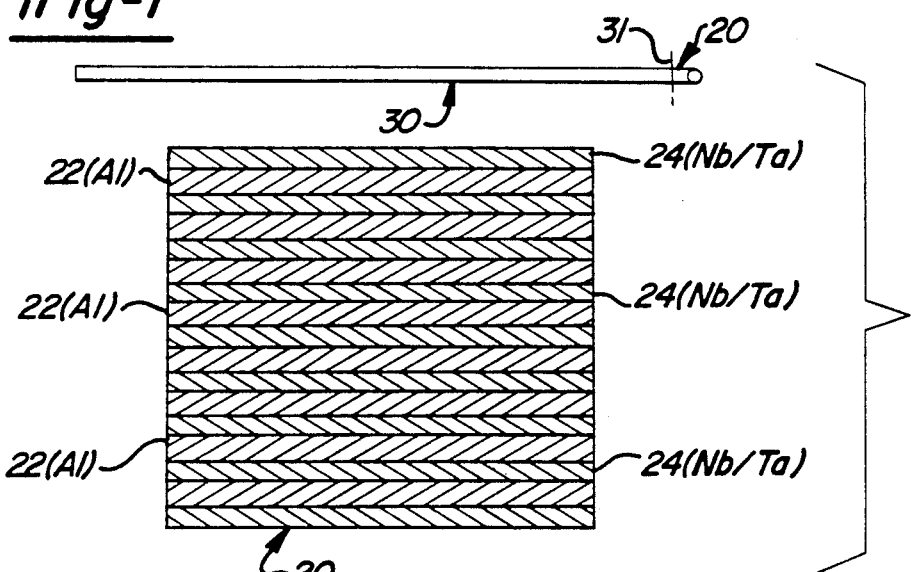
FIG. 3 is a highly schematic and enlarged illustration of a length of composite wire from which the electrode body is cut.

The consolidated powder billet is then deformation processed to form an elongated composite body 30, FIG. 3. The deformation processing step involves mechanically reducing the consolidated powder billet to achieve, for example a reduction in cross-sectional area of 99% or more. During deformation processing, the Al and X (Nb/Ta) powder constituents of the billet are deformed substantially to form discrete, ribbon-shaped Al and X (Nb/Ta) filaments 22,24 interspersed and elongated (aligned) along the longitudinal axis of the composite body 30. In general, the Al and X filaments in the composite body 30 will exhibit a ribbon-shape having a thickness t (FIG. 5) in the range of about 0.01 micron to about 0.50 micron. Of course, the ribbon-shaped Al and X (Nb/Ta) filaments 22,24 will be present in the composite body 30 in the same volumetric proportion that existed in the starting powder mixture.

The size, shape and distribution of the Al and X filaments in the deformation processed billet will depend on the Al and X powder sizes and shapes present in the starting powder mixture, the relative proportions of Al and X powders in the starting powder mixture, and the type and extent of deformation processing of the consolidated powder billet. As will become apparent hereinbelow, the size, shape and distribution of the Al and X filaments in the deformation processed composite body 30 is controlled to maximize the surface area of the electrode surface 25 to achieve a maximized CV/g value for the electrolytic capacitor 10.

The particular deformation process selected will depend on the shape desired for the composite body. For purposes of illustration and not limitation, a "round" mechanical reduction process such as rotary forging, swaging, extrusion including hydrostatic extrusion, or drawing may be used to produce a cylindrical wire or rod-shaped composite body 30. On the other hand, a flat rolling process may be used to produce a sheet-shaped composite body 30. Combinations of the aforementioned mechanical reduction processes may also be employed. For example, extrusion plus swaging of the consolidated powder billet can be employed to form a wire or rod-shaped composite body 30 while swaging plus rolling can be used to make a sheet-shaped composite body 30. Moreover, multiple lengths of the composite body 30 can be cut (perpendicular to the longitudinal axis L of the body 31) and aligned in parallel relation to one another to form a bundle for further deformation processing. The bundling technique is advantageous to achieve an ultra high reduction in area during deformation processing of the consolidated powder billet and is illustrated in Examples 1 and 2 set forth hereinbelow.

Although the invention is not limited to any particular deformation process (or combinations of such processes) to produce the elongated composite body 30, certain specific processes are illustrated in more detail in the Examples 1–4 set forth hereinbelow.

Typically, in preparation for deformation processing, the consolidated powder billet is enclosed in a protective tube of copper, tantalum or aluminum that is sealed with end plugs of lead. A protective tube of tantalum or aluminum is advantageous to prevent possible contamination of the compacted powder billet during deformation processing with a tube material, such as copper, that may be harmful to the electrical current leakage characteristics of the electrolytic capacitor 10.

Figure 7:
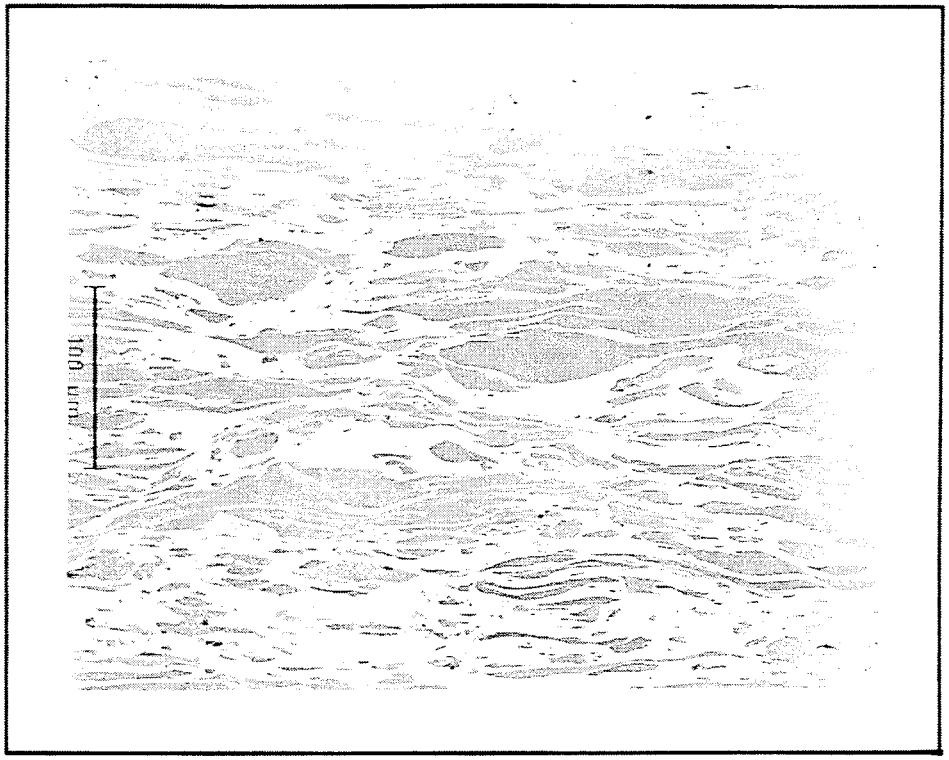
FIG. 7 is a photomicrograph at 250x of a longitudinal section of a 50 v/o Al-50 v/o Ta composite wire from which the electrode body of Example 1 is cut.
Figure 8:
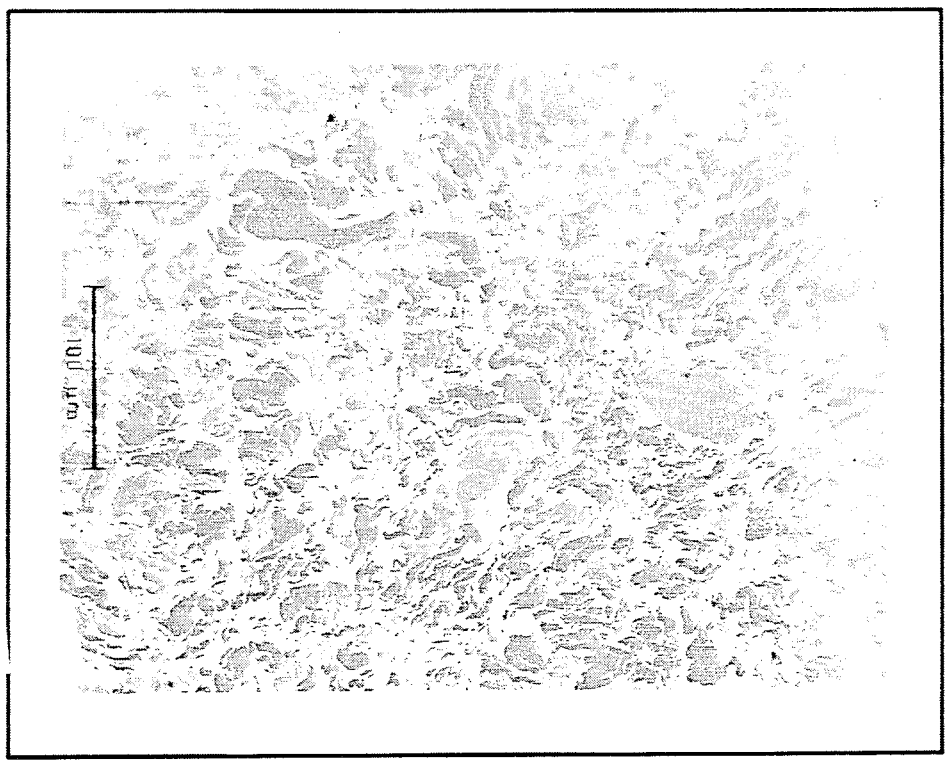
FIG. 8 is a photomicrograph at 250X of a transverse section of the 50 v/o Al-50 V/o Ta composite wire of FIG. 7.
Figure 9:
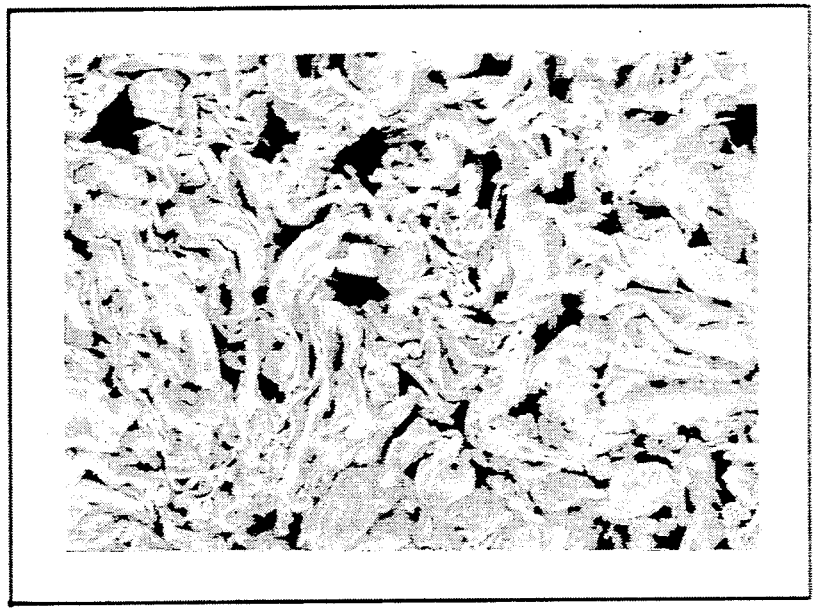
FIG. 9 is a scanning electron photomicrograph at 569 X of the as-etched electrode surface formed on the 50 v/o Al-50 v/o Ta electrode body of Example 1.
Figure 10:
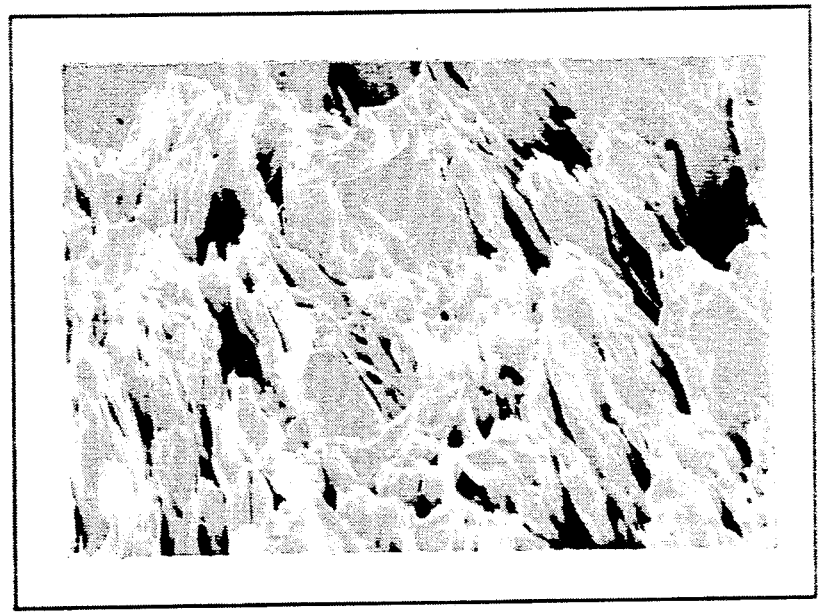
FIG. 10 is a scanning electron photomicrograph at 994X of the as-etched electrode surface of FIG. 9 with the electrode body axis tilted 38°.
Figure 11A:
FIGS. 11A and 11B are scanning electron photomicrographs at 2340X of the as-etched electrode surface of FIG. 10.
Figure 11B:

Referring to FIG. 3, the elongated composite body 30 produced by the deformation processing step(s) described hereinabove is illustrated as an elongated, cylindrical wire or rod. The composite wire 30 exhibits a microstructure comprising the axially elongated, ribbon-shaped Al and X (Nb/Ta) filaments 22,24 dispersed and aligned along the wire axis. Those skilled in the art will appreciate that the microstructure is shown in FIG. 3 quite schematically and considerably enlarged in scale for clarity and actually represents only a minuscule region across the wire diameter. Reference is made at this point to FIGS. 7–8 Example 1) and FIGS 13–14 (Example 4) which are actual photomicrographs of composite wire microstructures produced by the deformation processing set forth in those Examples. As is apparent, the composite wire 30 actually includes millions of ultra-fine, ribbon-shaped filaments of Al and X (Nb/Ta) dispersed and aligned along the wire axis.

A disc-shaped electrode body 20 is formed from the composite wire 30 by making a cut transversely of the wire axis (see cut line 31). The cut is preferably made using a diamond saw to minimize working or smearing of the filaments, especially the Nb/Ta filaments, across the cut surface. Typically, the overall length of the electrode body 20 cut from the composite body 30 will be in the range of about 0.50 mm to about 1.00 mm. The diameter of the electrode body 20 will correspond to the diameter of the composite wire 30 and generally fall in the range of about 1 mm to about 5 mm.

However, other dimensions as well as other configurations of the electrode body 20 can be used in practicing the invention. For example, as set forth hereinabove and also in Examples 3 and 4 herebelow, the electrode body 20 can have a thin sheet or strip configuration.

In accordance with the invention, the disc-shaped electrode body 20 is subjected to an etching step to selectively remove the Al filaments 26 to a selected axial depth D (FIG. 4) along the longitudinal axis thereof. Preferential dissolution of the Al filaments to the selected axial depth D produces the electrode surface 25 comprising the exposed surfaces 26 (e.g., exposed ends) of the Al filaments 22 and the exposed lengths 28 of the X filaments 24 protruding beyond the exposed surfaces 26 and providing interfilament interstices 30 between the exposed lengths 28, as shown schematically in FIGS. 4–5.

In one embodiment of the invention, but cut end of the electrode body 20 is etched in a 10% NaOH aqueous solution to the selected depth D to preferentially dissolve the Al filaments 22 from around the X (Nb/Ta) filaments 24. Preferably, the cut end is given an initial etch in an acid solution (55 v/o $H_2SO_4$ — 25 v/o HNO$_3$—20 v/o HF) to remove any worked (smeared) metal (usually Ta or Nb) present on the cut surface as a result of the diamond sawing operation. This initial etch is effective to remove any smeared metal that might otherwise inhibit penetration of the NaOH etchant into the Al filaments 22.

Figure 4:
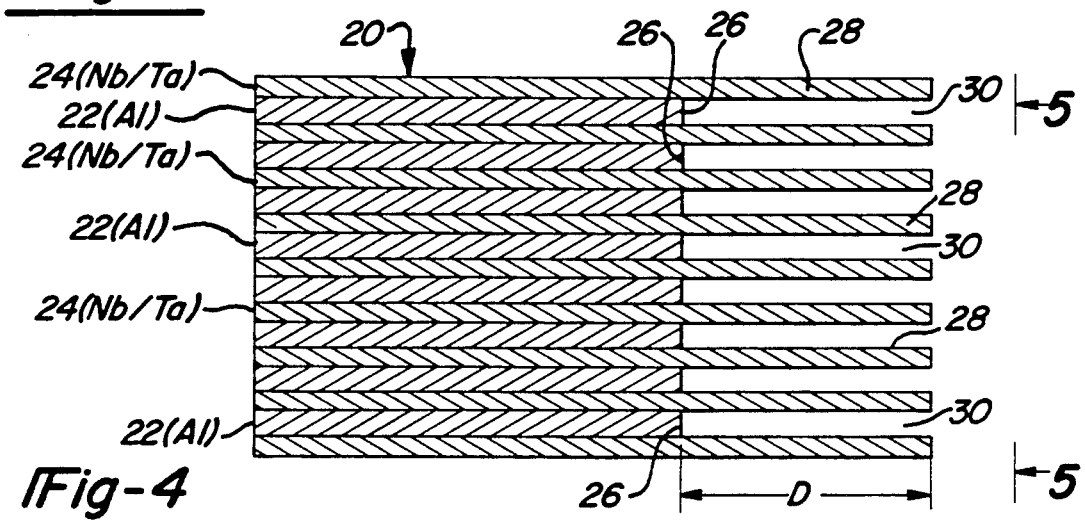
FIG. 4 is a schematic illustration of the electrode body of FIG. 3 after the Al filaments have been selectively removed from around the filaments to a selected axial depth along the wire axis.
Figure 5:
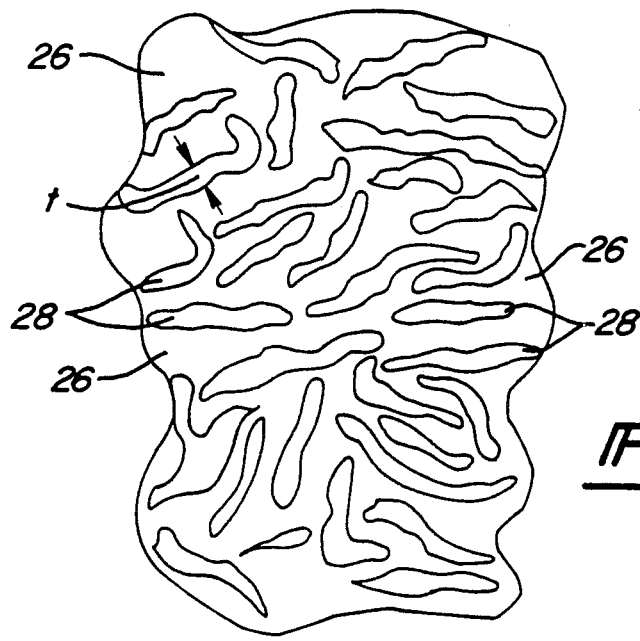
FIG. 5 is a highly schematic plan view of the electrode surface after the Al filaments have been selectively removed.

As shown schematically in FIGS. 4–5 and in actual photomicrographs in FIGS. 9, 10 and 11A,11B (Example 1), the electrode surface 25 produced by this selective etching process comprises millions of ultra-fine, ribbon-shaped exposed lengths 28 of the X (Nb/Ta) filaments 24 protruding beyond the exposed Al surfaces 26 (exposed ends) of the Al filaments 22 to an axial length corresponding to the depth D of etch along the axis of the electrode body 20. As a result of the presence of millions of exposed lengths 28 of the X filaments 24 and exposed ends 26 of the Al filaments 22, the electrode surface 25 so produced exhibits an extremely large surface area (e.g., on the order of 1000 square centimeters on a 1 square centimeter of the electrode body). This extremely large electrode surface area is advantageous in providing improved CV/g values when the electrode 20 is incorporated into the electrolytic capacitor 10 in the manner to be described hereinbelow.

The depth D of etch along the axis of the electrode body 20 determines the extent to which the X filaments 24 protrude beyond the exposed ends 26 of the Al filaments 22 and thus the actual surface area of the electrode surface 25. In general, the depth D of etch can be varied as needed to maximize the electrode surface are for a given specified capacitance of the electrolyte capacitor 10.

Although axial etching of the disc-shaped electrode body 20 is described in detail hereinabove, the electrode body 20 can be etched in order directions to form the electrode surface 25. For example, radial etching of an axial portion of the disc-shaped electrode body 20 can be employed. Moreover, the disc-shaped electrode body 20 can be cut longitudinally to provide an axially extending, flat, cut electrode body surface that can be etched perpendicular thereto. Regardless of the direction of etching, an unetched portion of the electrode body 20 should remain to anchor the exposed lengths 28 of the X filaments on the electrode surface 25. In most cases, axial etching of the electrode body 20 as described hereinabove in detail is preferred to achieve a higher electrode surface area.

After the aforementioned etching step, the electrode surface 25 is treated to form a thin dielectric oxide film or layer 27 of aluminum oxide on the exposed surfaces 26 of the Al filaments 22 and a thin, dielectric oxide film or layer 29 of X oxide on the exposed lengths 28 of the X (Nb/Ta) filaments 24. A convenient and effective technique for forming the dielectric oxides involves electrochemically anodizing the exposed surfaces 26 and exposed lengths 28 in san electrolytic cell.

In particular, a small diameter (e.g., 5 mil) Ta anode lead wire 33 (FIG. 1) is typically spot welded to the unetched end of the disc-shaped electrode body 20. The electrode body 20 is then made an anode relative to a platinum cathode in a vigorously stirred anodizing solution maintained at a constant temperature of about 90° C. Although various anodizing solutions may be employed, a 0.01 M phosphoric acid solution is quite useful as the anodizing solution. Alternately, a 0.02 M solution of diammonium citrate in a 25/75 (weight basis) water-/ethylene glycol solvent may also be useful as an anodizing solution. The latter anodizing solution may be particularly useful in minimizing possible electrical leakage currents associated with the Al oxide film formed on the exposed surfaces 26 of the Al filaments 22. This latter anodizing solution has been used heretofore to anodize porous sintered, aluminum powder electrodes (e.g., see "Anodic Oxidation Of Porous Aluminum Pellets", *Electrocomponent Science & Technology*, 1974, Vol. 1, pp. 59–64).

A constant anodizing current (e.g., one milliamp) is typically supplied to the electrode body 20 (as the anode) until a terminal voltage in the range of about 5–100V (D.C.) is reached. Thereafter the terminal voltage is maintained constant for a predetermined period of time (e.g., about one hour) to form the desired dielectric oxides of Al and X on the exposed surfaces 26 and exposed lengths 28. The particular terminal voltage employed will depend on the ultimate working voltage of the electrolytic capacitor 10 in service, as is well known in the electrolytic capacitor industry.

Figure 6:
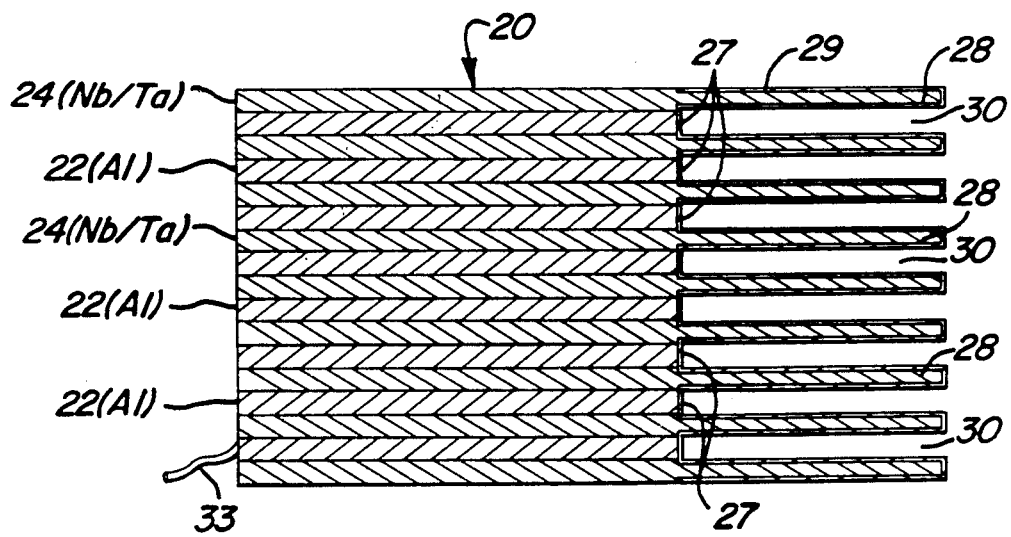
FIG. 6 is a schematic illustration similar to FIG. 4 of the electrode body after formation of dielectric oxide films on the exposed surfaces of the Al filaments and the exposed lengths of the X filaments to provide a capacitor electrode element in accordance with the invention.

Anodization of the electrode surface 25 produces the anode electrode element 12 (FIGS. 1 and 6) which comprises the electrode body 20 having (a) the large surface area electrode surface 25 described hereinabove, (b) the thin, dielectric oxide film 27 of aluminum oxide on the exposed surfaces 26 of the Al filaments 22 and (c) the thin, dielectric oxide film 29 of X oxide on the exposed lengths 28 of the X filaments 24.

Following anodization, the anode electrode element 12 is typically washed in distilled water for several hours to remove residues of the anodizing solution. The washed anode electrode element 12 is then dried at 125° C. for about 10 minutes.

Fabrication of the electrolytic capacitor 10 (FIG. 1) is then completed by filling or infiltrating the interfilament interstices 30 of the electrode surface 25 with the solid or liquid electrolyte 15 and forming the cathode electrode element 14 in contact with the electrolyte 15. An illustrative technique for infiltrating the interstices 30 involves repeatedly dipping the anode electrode element 12 in a 50% by weight solution of MnNO$_3$, air drying the electrode element 12 after each drying. The deposited MnNO$_3$ is pryolyzed by heating the dried anode electrode element 12 at about 350° C. for about 5 minutes to form a solid manganese dioxide (MnO$_2$) electrolyte 15 in the interstices 30.

The aforementioned electrolyte-forming sequence is repeated as necessary to infiltrate the interstices 30 of the anode electrode element 12 with the solid MnO$_2$ electrolyte 15 in intimate contact with the dielectric oxide films 27,29 previously formed on the exposed surfaces 26 and the exposed lengths 28 of the Al and X filaments 22,24. The MnO$_2$ solid electrolyte is built-up to provide a solid, level electrolyte layer 15$a$ over the exposed lengths 28 of the X filaments to facilitate formation of the cathode electrode 14 directly thereon in the following manner.

The cathode electrode element 14 is formed by coating the electrolyte layer 15$a$ with a colloidal graphite layer 14$a$, coating the graphite layer 14$a$ with silver paint 14$b$ and then embedding a cathode lead wire 52 in the silver paint layer 14$b$. The cathode electrode element 14 thusly formed is in 10 electrically conductive relation to the dielectric oxide films 27,29 via the solid MnO$_2$ electrolyte 15 infiltrated into the interfilament interstices 30.

In lieu of the solid electrolyte 15, the invention also contemplates using a liquid electrolyte . In particular, the interfilament filament interstices 30 can be infiltrated with an electrolyte comprising an ionic salt dissolved in a non-aqueous solvent such as dimethyl formamide. In the event that a liquid electrolyte is used, the cathode electrode element 14 would comprise a platinized silver can or enclosure containing the electrolyte.

The electrolytic capacitor 10 formed in accordance with the procedures set forth hereinabove is then hermetically sealed to provide a final packaged capacitor component capable of use with other electronic components in an intended service application.

The following specific Examples are offered to illustrate the invention in still greater detail.

EXAMPLE 1

Powder Processing

Aluminum powder (−325 mesh) and tantalum powder (200 mesh) were blended together in a ratio of 50 v/o Al to 50 v/o Ta (v/o is volume percent). This starting powder mixture was then compacted by cold isostatic pressing (CIP) to a density of 75% of theoretical to provide a cylinder of about ¾ inch diameter and several inches in length.

Deformation Processing

The consolidated Al-Ta powder cylinder was placed in a copper tube and the tube then sealed with end plugs of lead. The encapsulated CIP'ed powder cylinder was then mechanically reduced by swaging at room temperature to provide an outside diameter (O.D.) of the tube of 0.116 inch (O.D. of swaged cylinder inside tube was 0.1 inch). The composite rod resulting from swaging the tube was then cut into sixty four (64) one inch lengths. The copper jacket was then removed from each length with nitric acid. The sixty four (64) rods were aligned parallel to one another in a bundle and the bundle was inserted into a copper tube and the tube then sealed with lead end plugs. The encapsulated bundle was then swaged at room temperature to an O.D. of the tube of 0.116 inch. FIGS. 7-8 illustrate the composite microstructure of the resulting deformation processed rod.

Capacitor Processing

After swaging to the 0.116 inch O.D., the encapsulated bundle was dejacketed (using nitric acid to dissolve the copper tube) and 1 mm thick disc-shaped slices (constituting disc-shaped electrode bodies 20) were cut from the resulting rod by diamond sawing. The disc-shaped electrode bodies were alternately etched in an acid solution (55 v/o $H_2SO_4$−25 v/o $HNO_3$−20 v/o HF for 10 minutes and in 10% NaOH for 10 minutes to remove the smeared/worked metal from the diamond sawing operation. Then, the electrode bodies were deeply etched for 15 minutes in 10% NaOH aqueous solution to remove the Al phase to an axial depth of 60 microns. FIGS. 9, 10 and 11A,11B illustrate the resulting deeply etched electrode surface 25.

Three of these etched disc-shaped electrode bodies, each weighing about 0.052 gram, were anodized at 30 VDC in a 0.01 M phosphoric acid solution as described hereinabove. After anodizing, the resulting anode electrode elements 12 were dipped in a 50% aqueous solution of $MnNO_3$, air dried and pyrolyzed at 350° C. for 5 minutes. This electrolyte treatment sequence was repeated a total of six times for each anode electrode element and resulted in an outer solid layer of $MnO_2$ electrolyte over the anodized electrode surface. The $MnO_2$ layer was then coated with a colloidal graphite layer, then coated with silver paint and a cathode wire was thereafter embedded in the silver paint layer.

The resulting electrolytic capacitors were tested using a universal impedance bridge operating at 1 KHz with an applied voltage of 0.5 VAC. The results of the capacitor testing on these samples is shown in the following Table I:

TABLE 1

| Sample | Weight (grams) | Capacitance (mfd) | Eff. Series R (ohms) | CV/g (mfd-volt/gram) |
|---|---|---|---|---|
| 1 | 0.052 | 1.152 | 5.8 | 664 |
| 2 | 0.052 | 1.172 | 3.9 | 676 |
| 3 | 0.052 | 0.963 | 6.1 | 555 |

EXAMPLE 2

Powder Processing

Same as Example 1.

Deformation Processing

A 0.116 inch outer diameter composite rod was produced in the same manner as set forth for Example 1. The composite rod was then dejacketed from the copper tube, cleaned and forty-nine (49) one inch lengths of the composite rod were aligned parallel with one another to form a bundle. The bundle was then placed in a copper tube and the tube sealed with lead end plugs. The bundled rods were deformed (swaged) at room temperature to 0.116 inch outer diameter of the tube.

Capacitor Processing

After swaging, the copper tube was removed using nitric acid and several disc-shaped slices (constituting electrode bodies 20) of 0.5 mm axial thickness were cut from the swaged rod by diamond sawing. The resulting disc-shaped electrode bodies were etched as in Example 1 but with a variable etching time. Then, electrolytic capacitors were fabricated from these etched electrode bodies using the procedures set forth for Example 1. Results of the testing are given in the following Table 2.

TABLE 2

| Sample | Etch Time (min) | Capacitance (mfd) | Eff. Series Resis. (ohms) | CV/g (mfd-volt/gram) |
|---|---|---|---|---|
| 1 | 1 | .219 | 4.2 | 228 |
| 2 | 15 | 0.923 | 9.1 | 1270 |
| 3 | 45 | 2.19 | 6.1 | 5973 |
| 4 | 90 | 4.04 | 6.7 | 6475 |
| 5 | 120 | 4.06 | 5.6 | 10064 |

The dramatic improvement in CV/g values for these samples over that of Example 1 was believed to be due to a combination of two factors. First, the electrode axial length was reduced from 1 mm to ½ mm. Second, the Al and Ta filaments were mechanically reduced to a greater extent than the Al and Ta filaments of Example 1.

Figure 12:
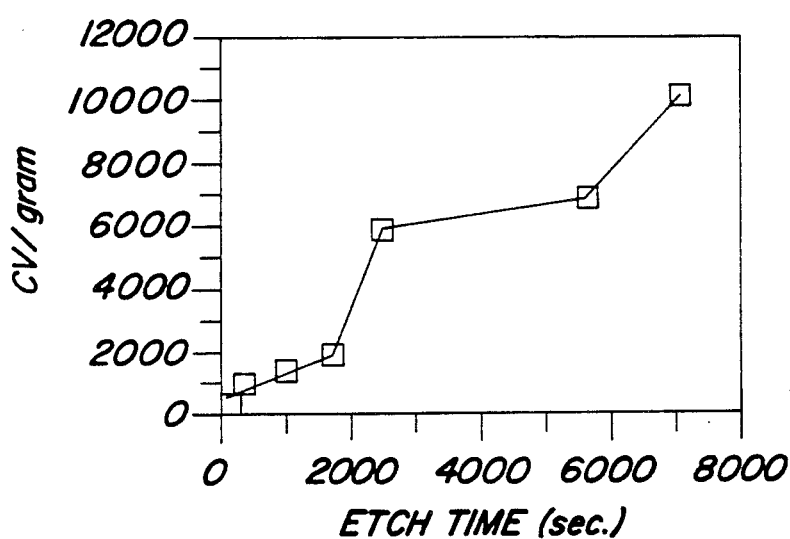
FIG. 12 is a graph illustrating the parameter CV/g as function of etch time for a series of electrolytic capacitors constructed in accordance with the invention as described in Example 2.

FIG. 12 illustrates the dependence of the CV/g values for the electrolytic capacitors of Example 2 versus the time of etching of the disc-shaped electrode bodies. The increase in the parameter, CV/g, with increases in etch time is quite apparent and noticeable. This dependence provides a way to vary/control the capacitance of electrolytic capacitors produced in accordance with the invention.

EXAMPLE 3

Powder Processing

Aluminum powder and tantalum powders like those of Example 1 were blended together in a ratio of 25 v/o Al to 75 v/o Ta. This starting powder mixture was then compacted as set forth in Example 1 to produce a cylinder of about ¾ inch diameter and several inches in length.

Deformation Processing

The consolidated Al-Ta powder cylinder was placed in a copper tube and the tube sealed with end plugs of lead. The encapsulated cylinder was then mechanically reduced by swaging at room temperature such that the outer diameter (O.D.) of the tube was reduced to 0.132 inch. The resulting 0.132 O.D. rod was then reduced to 0.012 inch thick sheet by cold rolling. The sheet was cut (perpendicular to its long axis) into strips ⅛ inch wide and ¾ inch long. The copper jacket was then removed from the cut strips by etching in a nitric acid solution.

Capacitor Processing

The Al-Ta strips were etched in a 10% aqueous NaOH solution for various times to preferentially remove the Al to a selected axial depth or distance along the strip length. After etching, a 5 mil diameter Ta anode lead wire was spot welded to the unetched end of each strip-shaped electrode body formed by etching of the cut strips. Some electrode bodies (identified as samples #1–#6 in Table 3) were anodized at 100 VDC and one electrode body (identified as sample 8 in Table 3) was anodized at 10 VDC. After anodizing, the resulting strip-shaped electrode elements were fabricated into electrolytic capacitors as set forth in Example 1 and the capacitors were tested using the same procedures as set forth in Example 1. The following Table 3 shows the results for the electrolytic capacitors fabricated using the strip-shaped anode electrode elements.

TABLE 3

| Sample | Etch Time (min) | Weight (grams) | Capacitance (mfd) | Eff. Series R (ohms) | CV/g (mfd-v/gram) |
| --- | --- | --- | --- | --- | --- |
| 1 | 1 | 0.2042 | 0.55 | 20.1 | 270 |
| 2 | no etch | 0.2016 | 0.39 | 75.5 | 193 |
| 3 | 15 | 0.2083 | 1.84 | 23.7 | 885 |
| 4 | 1.5 | 0.113 | 0.68 | 7.5 | 600 |
| 5 | 1.5 | 0.113 | 0.68 | 8.9 | 600 |
| 6 | 1.5 | 0.113 | 0.68 | 14.7 | 600 |
| 8 | 1.5 | 0.113 | 4.90 | 4.1 | 434 |

The electrolytic capacitors made from identically etched/anodized electrode bodies (corresponding to samples #4, #5 and #6) illustrate excellent reproducibility in the measured CV/g values.

EXAMPLE 4

Powder Processing

Aluminum powder (−325 mesh) and niobium powder (200 mesh) were blended together in a ratio of 25 v/o Al to 75 v/o Nb. This starting powder mixture was then compacted by cold isostatic pressing (CIP) to a density of around 75% of theoretical to provide a cylinder of about ¾ inch diameter by several inches long.

Deformation Processing

Figure 13:
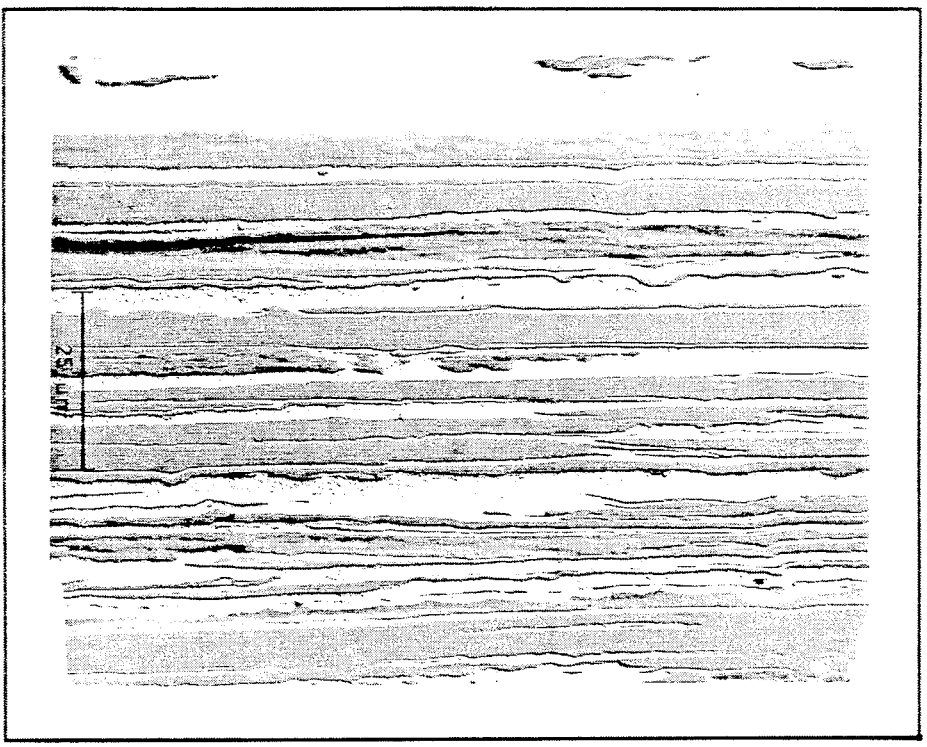
FIG. 13 is a photomicrograph at 1000X of a longitudinal section of a 25 v/o Al-75 v/o Nb composite wire from which the electrode body of Example 4 is cut.
Figure 14:
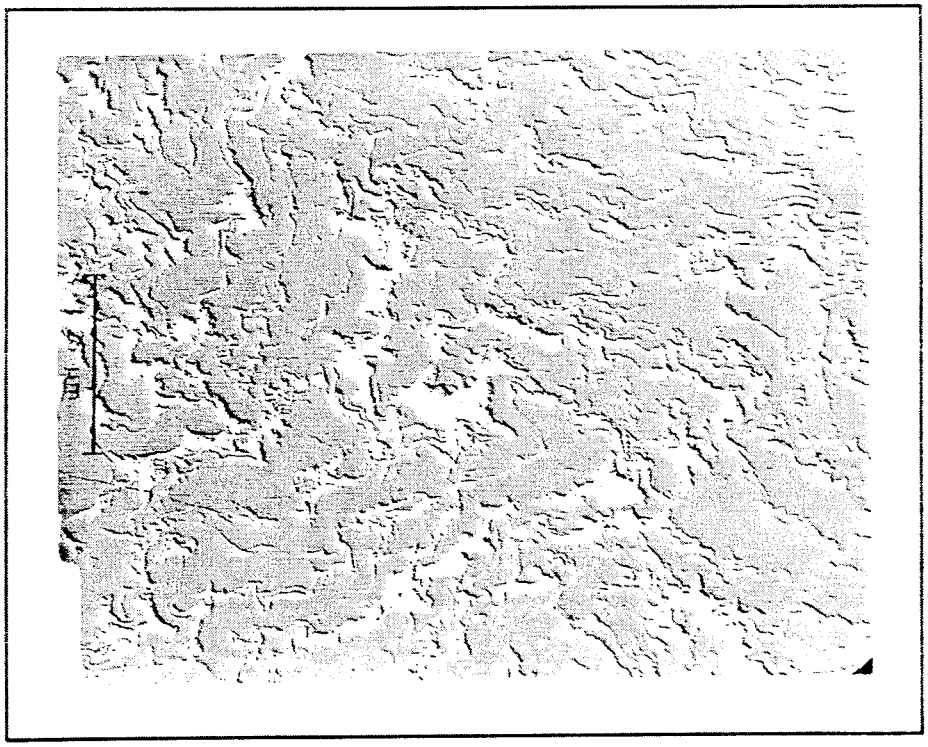
FIG. 14 is a photomicrograph at 1000X of a transverse section of the 25 v/o Al-75 v/o Nb composite wire of FIG. 13.

The consolidated Al-Nb cylinder was placed in a copper tube and the tube sealed with end plugs of lead. The encapsulated cylinder was then mechanically reduced by swaging to reduce the outer diameter (O.D.) of the copper tube from about 1 inch to about 0.05 inch. After swaging, the copper tube was etched away using nitric acid, leaving Al-Nb composite wire of 0.04 inch diameter. A portion of the composite wire was drawn further to 0.018 inch diameter. FIGS. 13 and 14 are sections of the 0.018 diameter drawn wire. Another portion of the Al-Nb composite wire (0.04 inch dia.) was severed and further reduced by cold rolling to produce a strip which was ⅛ inch wide by 0.01 inch thick.

Capacitor Processing

The deformation processed Al-Nb wire and strip were cut perpendicular to the wire or strip axis to produce 0.375 inch long wire electrode bodies and 0.75 inch long strip electrode bodies. The electrode bodies were etched in a 10% aqueous NaOH solution for various times to preferentially remove the Al to a selected depth along the wire or strip axis. After etching, a 5 mil diameter Ta anode lead wire was spot welded to the unetched end of each wire or strip electrode body.

The wire and strip electrode bodies were anodized at 100 VDC in 0.01 M phosphoric acid solution as described hereinabove. After anodizing, the resulting anode electrode elements were fabricated into electrolytic capacitors as set forth in Example 1 and the capacitors were tested using the same procedure as set forth in Example 1. Table 4 sets forth the results for these test capacitors.

TABLE 4

| Sample | Etch Time (min) | Weight (grams) | Capacitance (mfd) | Eff. Series R (ohms) | CV/g (mfd-v/gram) |
| --- | --- | --- | --- | --- | --- |
| 1 (sheet) | 3 | 0.12 | .577 | 29 | 481 |
| 2 (sheet) | 15 | 0.12 | 3.71 | 7 | 3091 |
| 3 (wire) | 15 | 0.12 | 1.56 | 20 | 1300 |
| 4 (wire) | 15 | 0.12 | 1.52 | 31 | 1267 |

The Examples 1–4 set forth hereinabove demonstrate that electrolytic capacitors fabricated in accordance with the present invention exhibit useful CV/g values at least comparable to those exhibited by commercially available sintered, Ta pellet capacitors made from the same particle size powder (which exhibit CV/g values in the range of 1000). Moreover, the CV/g values obtained from the electrolytic capacitors fabricated in accordance with the present invention are quite reproducible from one capacitor to the next when identical fabrication techniques are employed. Furthermore, these advantageous characteristics are obtainable in a useful compact capacitor size in general no larger than the size of sintered, Ta powder pellet electrolytic capacitors heretofore used in the electronics industry.

While the invention has been described in terms of certain specific embodiments thereof, it is not intended to be limited thereto but rather only to the extent set forth hereafter in the claims which follow.

We claim:

1. A capacitor element, comprising (a) an electrode body having a plurality of elongated filaments of Al and X interspersed and aligned along an axis of the electrode body, X being selected from the group consisting of Nb and Ta, said electrode body having an electrode surface comprising exposed surfaces of the Al filaments and exposed lengths of the X filaments protruding beyond the exposed surfaces of the Al filaments to provide interfilament interstices between said lengths, (b) a dielectric oxide of X formed on the exposed lengths of said X filaments, and (c) a dielectric oxide of Al formed on the exposed surfaces of said Al filaments.

2. The element of claim 1 wherein said filaments of X and Al exhibit a ribbon shape in transverse cross-section.

3. The element of claim 2 wherein the ribbon-shaped filaments of X have a thickness in the range from about 0.01 micron to about 0.50 micron.

4. The element of claim 1 wherein the electrode body includes a longitudinal axis and said filaments of X and Al are aligned along said longitudinal axis, said exposed surfaces of the Al filaments being oriented transversely of said longitudinal axis and said exposed lengths of the X filaments being parallel to said longitudinal axis.

5. The element of claim 4 wherein said electrode body comprises a cylindrical disc cut transversely from a wire formed by mechanical working of a mixture of powders of X and Al to align the filaments of X and Al along a longitudinal axis of the wire.

6. The element of claim 5 wherein the exposed surfaces of the Al filaments and the exposed lengths of the X filaments comprise an axially extending portion of said disc from which the Al filaments are selectively removed to a given axial depth.

7. The element of claim 1 wherein the said interspersed filaments comprise about 50 volume percent to about 95 volume percent of said X filaments, the balance being said Al filaments.

8. The element of claim 7 wherein said interspersed filaments comprise about 80 volume percent to about 90 volume percent of said X filaments, the balance being said Al filaments.

9. An electrolytic capacitor, comprising: (a) an anode electrode body having a plurality of elongated filaments of Al and X interspersed and aligned along an axis of the electrode body, X being selected from the group consisting of Nb and Ta, said electrode body having an electrode surface comprising exposed surfaces of the Al filaments and exposed lengths of the X filaments protruding beyond the exposed surfaces of the Al filaments to provide interfilament interstices between said lengths, (b) a dielectric oxide of X formed on the exposed lengths of said X filaments, (c) a dielectric oxide of Al formed on the exposed surfaces of said Al filaments, and (d) a cathode electrode in electrically conductive relation to the dielectric oxides of X and Al.

10. The capacitor of claim 9 wherein said filaments of X and Al exhibit a ribbon shape in transverse cross-section.

11. The capacitor of claim 10 wherein the ribbon-shaped filaments of X have a thickness in the range from about 0.01 micron to about 0.50 micron.

12. The capacitor of claim 9 wherein the electrode body includes a longitudinal axis and said filaments of X and Al are aligned along said axis, said exposed surfaces of the Al filaments being oriented transversely of said longitudinal axis and said exposed lengths of the X filaments being parallel to said longitudinal axis.

13. The element of claim 12 wherein said electrode body comprises a cylindrical disc cut transversely from a wire formed by mechanical working of a mixture of powders of X and Al to align the filaments of X and Al along a longitudinal axis of the wire.

14. The capacitor of claim 13 wherein the exposed surfaces of the Al filaments and the exposed lengths of the X filaments comprise an axially extending portion of said disc from which the Al filaments are selectively removed to a selected axial depth.

15. The capacitor of claim 9 wherein said filaments comprise about 50 volume percent to about 95 volume percent of said X filaments, the balance being said Al filaments.

16. The capacitor of claim 15 wherein said filaments comprise about 80 volume percent 5 to about 90 volume percent of said X filaments, the balance being said Al filaments.

17. The capacitor of claim 9 further comprising an electrolyte between the dielectric oxides and the cathode electrode.

18. The capacitor of claim 17 wherein the electrolyte comprises a solid conductor.

19. The capacitor of claim 18 wherein the solid conductor comprises manganese dioxide.

20. The capacitor of claim 17 wherein the electrolyte comprises a liquid conductor.

21. The capacitor of claim 20 wherein the liquid conductor comprises an ionic salt dissolved in a non-aqueous solvent.

22. A method of making a capacitor element, comprising the steps of:
(a) forming an electrode elongated filaments of Al and X interspersed and aligned along an axis of the body, X being selected from the group consisting of Nb and Ta,
(b) selectively removing the Al filaments from a portion of said electrode body to form an electrode surface comprising exposed surfaces of the Al filaments and exposed lengths of the X filaments protruding beyond the exposed surfaces of the Al filaments to provide interfilament interstices between said lengths,
(c) forming a dielectric oxide of X on the exposed lengths of the X filaments, and
(d) forming a dielectric oxide of Al on the exposed surfaces of the Al filaments.

23. The method of claim 22 wherein the electrode body is formed in step (a) by mechanical working of a mixture of powders of X and Al to form an elongated member having the filaments of X and Al aligned along the a longitudinal axis thereof and then severing the member transversely of the longitudinal axis to form the electrode body.

24. The method of claim 23 wherein the Al filaments are selectively removed from an axially extending portion of said electrode body to form the exposed surfaces of the Al filaments and the exposed lengths of the X filaments.

25. The method of claim 24 wherein the Al filaments are selectively removed by preferential dissolution of the Al filaments from around the X filaments.

26. The method of claim 23 wherein the mixture is mechanically worked to provide ribbon-shaped filaments of X and Al aligned along the longitudinal axis.

27. The method of claim 26 wherein the ribbon-shaped filaments of X have a thickness from about 0.01 micron to about 0.50 micron.

28. The method of claim 22 wherein the filaments of X comprise about 50 volume percent to about 95 volume percent of said body, the balance of said body being the Al filaments.

29. The method of claim 28 wherein the filaments of X comprise about 80 volume percent to about 90 volume percent of said body, the balance of said body being the Al filaments.

30. The method of claim 22 wherein the dielectric oxide of X is formed on the exposed lengths of the X filaments in step (c) and the dielectric oxide of Al is formed on the exposed surfaces of the Al filaments in step (d) by anodizing said exposed surfaces and said exposed lengths.

31. A method of making an electrolytic capacitor, comprising the steps of:
 (a) forming an anode electrode by
  (1) forming an electrode body having a plurality of elongated filaments of Al and X interspersed and aligned along an axis of the body, X being selected from the group consisting of Nb and Ta,
  (2) selectively removing the Al filaments from a portion of the electrode body to form an electrode surface comprising exposed surfaces of the Al filaments and exposed lengths of the X filaments protruding beyond the exposed surfaces of the Al filaments to provide interfilament interstices between said lengths,
 (b) forming a dielectric oxide of X on the exposed lengths of the X filaments,
 (c) forming a dielectric oxide of Al on the exposed surfaces of the Al filaments,
 (d) disposing an electrical conductor in said interfilament interstices in contact with the dielectric oxides of X and Al, and
 (e) disposing a cathode electrode in electrically conductive relation to the conductor.

32. The method of claim 31 wherein the electrode body is formed in step (a)(1) by mechanical working of a mixture of powders of X and Al to form an elongated member having the filaments of X and Al aligned along the longitudinal axis thereof and then severing the member transversely of the longitudinal axis to form the electrode body.

33. The method of claim 32 wherein the Al filaments are selectively removed from an axially extending portion of said electrode body to provide the exposed surfaces on the Al filaments and the exposed lengths on the X filaments.

34. The method of claim 33 wherein the Al filaments are selectively removed by preferential dissolution of the Al filaments from around the X filaments.

35. The method of claim 32 wherein the mixture is mechanically worked to provide ribbon-shaped filaments of X and Al aligned along the longitudinal axis.

36. The method of claim 35 wherein the ribbon-shaped filaments of X have a thickness from about 0.01 micron to about 0.50 micron.

37. The method of claim 31 wherein the filaments of X comprise about 50 volume percent to about 95 volume percent of said body, the balance of said body being the Al filaments.

38. The method of claim 37 wherein the filaments of X comprise about 80 volume percent to about 90 volume percent of said body, the balance of said body being the Al filaments.

39. The method of claim 31 wherein the dielectric oxide of X is formed on the exposed lengths of the X filaments in step (c) and the dielectric oxide of Al is formed on the exposed surfaces of the Al filaments in step (d) by anodizing said exposed surfaces and said exposed lengths.

* * * * *

UNITED STATES PATENT AND TRADEMARK OFFICE
CERTIFICATE OF CORRECTION

PATENT NO. : 5,062,025

DATED : October 29, 1991

INVENTOR(S) : Verhoeven et al.

It is certified that error appears in the above-identified patent and that said Letters Patent is hereby corrected as shown below:

In claim 16, col. 14, line 13, delete "5".

In claim 22, col. 14, line 31, after "electrode" insert --body having a plurality of--.

In claim 32, col. 16, line 5, cancel "the" (first appearance) and substitute --a--.

Signed and Sealed this

Second Day of March, 1993

Attest:

STEPHEN G. KUNIN

Attesting Officer

Acting Commissioner of Patents and Trademarks